US011797708B2

(12) United States Patent
Bag

(10) Patent No.: US 11,797,708 B2
(45) Date of Patent: Oct. 24, 2023

(54) ANOMALY DETECTION IN DOCUMENTS LEVERAGING SMART GLASSES

(71) Applicant: Bank of America Corporation, Charlotte, NC (US)

(72) Inventor: Prasad Bag, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 363 days.

(21) Appl. No.: 17/313,076

(22) Filed: May 6, 2021

(65) Prior Publication Data

US 2022/0358238 A1 Nov. 10, 2022

(51) Int. Cl.
*G06F 21/62* (2013.01)
*G06N 20/00* (2019.01)
*G02B 27/00* (2006.01)
*G06F 40/20* (2020.01)
*G06F 3/01* (2006.01)
(Continued)

(52) U.S. Cl.
CPC ..... *G06F 21/6245* (2013.01); *G02B 27/0093* (2013.01); *G02B 27/017* (2013.01); *G06F 3/013* (2013.01); *G06F 40/20* (2020.01); *G06N 20/00* (2019.01); *G06V 30/416* (2022.01); *G02B 2027/0178* (2013.01)

(58) Field of Classification Search
CPC ...... G06F 21/6245; G06F 3/013; G06F 40/20; G06F 3/011; G06F 3/017; G06F 40/186; G02B 27/0093; G02B 27/017; G02B 2027/0178; G06N 20/00; G06N 3/04; G06N 3/09; G06V 30/416; G06V 10/82; G06V 20/20; G06V 30/412; G06V 30/414
See application file for complete search history.

(56) References Cited

U.S. PATENT DOCUMENTS 9,331,856 B1 5/2016 Song
9,460,351 B2 10/2016 Kim et al.
(Continued)

OTHER PUBLICATIONS

"An Introduction to TinyML," https://towardsdatascience.com/an-introduction-to-tinyml-4617f314aa79, Towards Data Science, Nov. 10, 2020.
(Continued)

*Primary Examiner* — Baotran N To
(74) *Attorney, Agent, or Firm* — Weiss & Arons LLP

(57) ABSTRACT

Systems and methods for leveraging smart glasses for identifying anomalies in a document is provided. Methods may include scanning the document and determining a document type based off pre-defined identifiable features extracted from the document. In parallel to determining, methods may include performing a series of actions to identify any anomalies. Methods may include tracking the user's eye movements and based off of the one or more portions of the document upon which the user's eyes are focused, capturing data from one or more portions, identifying a document characteristic and comparing the document characteristic to a predetermined document rule. When the document characteristic complies to the predetermined document rule, methods may include repeating the series of actions and when the document characteristic fails to comply with the predetermined document rule, methods may include displaying an image of the anomaly, on a display of the smart glasses.

20 Claims, 5 Drawing Sheets

(51) Int. Cl.
    *G02B 27/01*     (2006.01)
    *G06V 30/416*    (2022.01)

(56) References Cited

U.S. PATENT DOCUMENTS

| | | | |
|---|---|---|---|
| 9,665,818 B1 | 5/2017 | Cardinal et al. | |
| 9,823,735 B2 | 11/2017 | Spiessl et al. | |
| 2016/0041613 A1 | 2/2016 | Klanner et al. | |
| 2017/0156589 A1 | 6/2017 | Wu et al. | |
| 2020/0074647 A1* | 3/2020 | Moon | G06T 7/70 |
| 2022/0342998 A1* | 10/2022 | Singh | G06F 21/44 |
| 2022/0405507 A1* | 12/2022 | Verma | G06F 18/214 |
| 2023/0117181 A1* | 4/2023 | Gupta | G06F 16/27 |
| | | | 707/608 |

OTHER PUBLICATIONS

Zhuo et al., "Why TinyML is a Giant Opportunity," https://venturebeat.com/2020/01/11/why-tinyml-is-a-giant-opportunity/, VentureBeat, Jan. 11, 2020.

"Smartglasses," https://en.wikipedia.org/wiki/Smartglasses, Wikimedia Foundation, Inc., Feb. 21, 2021.

"Wearable Technology—Smart Glasses," https://www.optiscangroup.com/smartglasses, Optiscan, Retrieved on Mar. 4, 2021.

\* cited by examiner

ANOMALY DETECTION IN DOCUMENTS LEVERAGING SMART GLASSES

FIELD OF TECHNOLOGY

Aspects of the disclosure relate to smart glasses. Specifically, this disclosure relates to identifying anomalies in documents, in real-time, through smart glasses.

BACKGROUND OF THE DISCLOSURE

Entities manage and handle numerous important and legal documents. These documents need to be filled out, signed, reviewed and executed. Some documents may be a single page. Some documents may include a few pages. Yet some documents are many pages. Furthermore, many of the documents are very detail-oriented. These documents also include numerous input data and the accuracy of the input data is crucial.

At the reviewing stage, documents are reviewed for at least grammatical errors, syntax errors, formatting issues, authenticity, blank fields and proper signatures. When an individual reviews the document, it is very difficult to completely cover every portion of the document and identify all errors. Additionally, manually reading the document to check for errors may be very time consuming.

Therefore, it would be desirable to leverage smart glasses for scanning the document alongside the reader and identify, in real-time, the anomalies.

SUMMARY OF THE DISCLOSURE

A method for leveraging smart glasses for identifying anomalies in a document in real-time is provided. The smart glasses may also be leveraged for notifying a user of the smart glasses of the anomalies.

The method may include activating a scanning device on the smart glasses for scanning the document. The smart glasses may be included in the scanning device. Following the activating, the method may include identifying the document. The identifying may be for identifying the type of document that is being analyzed. The scanning device may scan the document when the document is within a predetermined proximity to the smart glasses.

The method may include performing a first process and a second process in parallel to one another. The first process may include determining a document type of the document. The second process may include performing a series of actions on the document to identify one or more anomalies in the document.

The determining of the document type may include capturing a single complete image of the document. Following the capturing, the determining may further include searching the single complete image, using natural language processing ("NLP"), for one or more pre-defined identifiable features relating to a type of the document.

The determining may further include identifying the one or more pre-defined identifiable features. Based on the identifying, the method may include determining the type of document.

In parallel to the determining of the type of document, the method may include performing a series of actions on the document to identify anomalies on the document. It should be appreciated that the series of actions may be repeated continuously until the document is outside the predetermined proximity of the smart glasses for a predetermined amount of time.

The series of actions may include triggering a tracking of the user's eye movements. The series of actions may also include, identifying, based at least in part on the tracking, one or more portions of the document upon which the user's eyes are focused.

The series of actions may further include capturing data from the one or more portions of the document. In response to the capturing of the data, the series of actions may include identifying, in the captured data, a document characteristic.

The series of actions may further include retrieving, from the ML database, a predetermined document rule. The predetermined document rule may define at least one feature of the document characteristics. The predetermined document rule may be retrieved from among a plurality of predetermined document rules stored in a document template correlating to the type of document.

The series of actions may also include comparing the document characteristic to the predetermined document rule. When the document characteristic complies to the predetermined document rule, the method comprises, repeating the series of actions.

When the document characteristic fails to comply with the predetermined document rule, the method may include displaying an image of the anomaly, on a display of the smart glasses. The display may be a virtual display. Following the displaying, the method may include repeating the series of actions.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
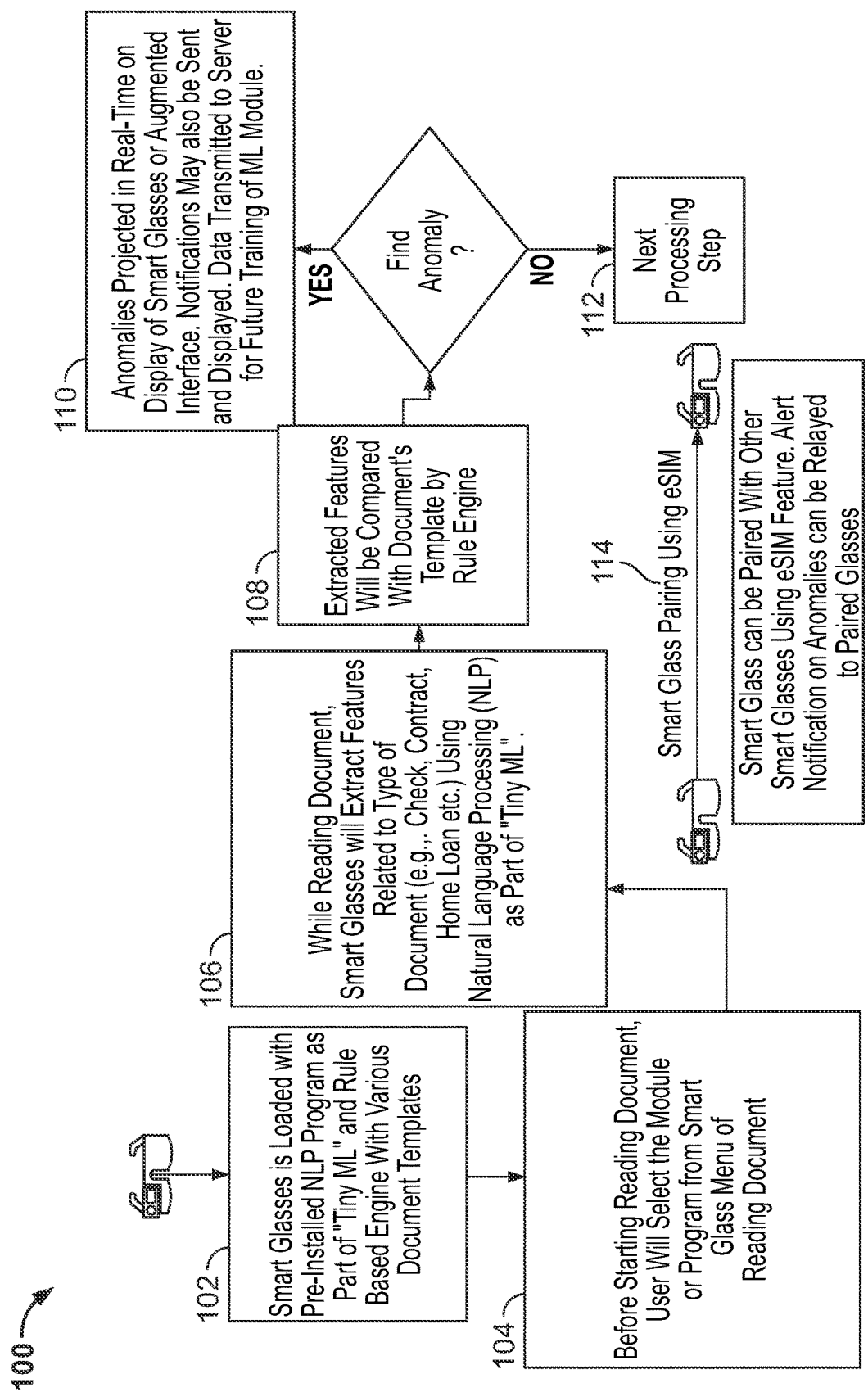
FIG. 1 shows an illustrative flow diagram in accordance with principles of the disclosure.

Architecture for a smart glasses device is provided. The smart glasses may be leveraged for identifying anomalies in a document in real-time. The smart glasses may also be leveraged for notifying a user of the smart glasses of the anomalies.

Smart glasses may be understood to mean wearable glasses that include both hardware and software components. One or more processors may be included in the hardware components of the smart glasses. The one or more processors may include one or more microprocessors. The microprocessor may provide processing capabilities to the plurality of hardware components and the plurality of software components within the smart glasses.

In addition to the processors, smart glasses may also include hardware components associated with conventional glasses. Such conventional components may include a frame and lenses.

Other hardware components of smart glasses may include one or more displays, one or more cameras for capturing photographs and/or videos, one or more audio input devices, one or more audio output devices, one or more communication transceivers, one or more wired and/or wireless communication applications (e.g., Bluetooth®, Beacon®) and/or any other suitable hardware components.

The smart glasses display may display data as instructed by the microprocessor. In one embodiment, the smart glasses display may be physically configured to add data alongside what the wearer sees through the lenses. In some embodiments, the smart glasses may use a display controller that may be configured to display data as an at least partially transparent overlay on top the lenses. As such, the user may view, through the overlay, the physical objects that are normally seen through lenses. Such a smart glasses display may be known as an augmented reality smart glasses display.

It should be appreciated that each of the microprocessor, scanning device, display controller and battery may be at least partially embedded in the frame of the smart glasses.

Additionally, smart glasses may utilize cellular technology or Wi-Fi to be operable as wearable computers which may run self-contained mobile applications. Smart glasses may be hands-on and/or handsfree and may be enabled to communicate with the Internet through natural language voice commands. Some smart glasses may require the use of touch buttons on the frame.

The weight of such smart glasses devices may be in the area of between about 20 grams to 60 grams or less or more than this range. The width of the lenses of such smart glasses devices may be between about 45 millimeters (mm) and 65 mm, and most preferably between about 50 mm to 56 mm. The length of the frames may be between about 126 mm and 153 mm.

Another component of smart glasses may include the ability for smart glasses to modify its optical properties, such as tint and change the prescription of the lenses. The optical properties modification may be executed at any given time. Smart glasses may change optical properties of the lenses by executing one or more software applications on the internal processors.

Smart glasses may also include one or more communication transceivers. The communication transceivers may be operable to communicate with external processors. The external processors may be included in a mobile device or any other suitable computing device.

The smart glasses may include a scanning device. The scanning device may be a camera. The scanning device may be configured to capture an image of a document. The scanning device may be configured to capture data from the documents. Documents, in accordance with principals of the disclosure may be actual paper documents placed within proximity to the scanning device on the smart glasses. Documents may include but are not limited to fillable forms, checks, contracts, loan collaterals and mortgage agreements.

The smart glasses may include a battery. The battery may be configured to power the microprocessor, the scanning device and the display.

The smart glasses may include a nano wireless network interface card ("NIC"). The nano wireless NIC may be a circuit board and/or a chip, installed within the smart glasses, that enables the smart glasses to establish communication with a wireless network. The nano wireless NIC may support input/output ("I/O"), interrupt, direct memory access, interfaces, data transmission, network traffic engineering and/or partitioning.

The nano wireless NIC may provide the smart glasses with a dedicated, full-time connection to a wireless network. The nano wireless NIC may provide the connection by implementing the physical layer circuitry necessary for communicating with a data link layer standard, such as Wi-Fi.

The nano wireless NIC may operate as an intermediary between the smart glasses and a wireless network. For example, the processor may transmit a request to the nano wireless NIC. The nano wireless NIC may convert the request into electrical impulses. The electrical impulses may be transmitted to a web server. The web server may respond to the nano wireless NIC with additional electrical signals. The nano wireless NIC receives the additional electrical signals. The nano wireless NIC translates the additional electrical signals into data that is consumable by the microprocessor.

The smart glasses may also include an active near field communication ("NFC") reader configured to establish a communication with one or more other smart glasses devices within a predetermined proximity to the smart glasses device. Smart glasses may communicate with one or more additional smart glasses and other smart devices using NFC technology.

Smart glasses may operate through the use of tinyML technology. The documents may be enabled to be analyzed using tinyML. TinyML may enable the smart glasses, which may be a low power consuming edge device to run both machine and deep learning models directly on the smart glasses and without having to communicate and send data to a cloud. Using tinyML may enable keeping the data secure and private. It may also enable low latency for users of the smart glasses. Furthermore, it may reduce the need for high storage and infrastructure costs. The smart glasses may only need to save necessary data and it also may only need to be saved temporarily.

In some embodiments of the disclosure, smart glasses may use a microcontroller which enables a CPU and all additional peripherals onto the same chip. In some embodiments, the smart glasses may use a microprocessor which includes a more powerful CPU on a single chip and may connect to other peripherals.

Machine learning may include a machine learning model which may be a mathematical algorithm which makes assumptions about information it ingests. Using the assumptions, the machine learning model may approximate properties of the ingested information and calculates new properties or determines how to respond to the ingested information.

Deep learning is a subset of machine-learning. Deep learning classifiers are input during a training stage as labeled training data, otherwise referred to as data that has been classified. Deep learning uses the classifiers to learn from the input data and use the learned information to correctly classify unlabeled data during execution. It should be appreciated that substantially no manual feature of engineering or manual feature of extraction is used during the data training process. A deep learning classifier creates, absent human interaction, a non-linear, multi-dimensional classification model based on the labeled-training data.

Deep learning classifiers typically utilize a layered structure of algorithms known as an artificial neural network ("ANN") to create the non-linear, multi-dimensional classification model. An ANN mimics the biological neural network of the human brain. The ANN is comprised of layers of neurons. Each neuron, included in each layer, takes one or more inputs and produces one output. The output is based on the values of the inputs as well as a weight associated with each inputted value. As such, one input can carry more weight than another input.

The smart glasses may also include an embedded subscriber identification module ("E-SIM") card. The E-SIM embedded on the smart glasses may enable one or more other smart glasses to communicate and share data.

The smart glasses may include software components. One or more software modules may execute on the processors. The one or more software applications may be stored in a memory located within the smart glasses. The one or more software modules may, in the alternative, be referred to as applications. The applications may enable the smart glasses to execute various tasks.

The smart glasses device may include a contactless communication application. The contactless communication application may operate on the smart glasses processor. The contactless communication application may initiate communication with another smart glasses. In some embodiments, the contactless communication application may be an active near field communication ("NFC") reader. As such, the contactless communication application may communicate with another smart glasses using NFC technology.

The smart glasses may include a natural language processing ("NLP") application. The NLP application may be used to identify the data included in the document. The NLP application may recognize the text and further decipher features and characteristics associated with the data.

The smart glasses may include a machine learning ("ML") database. The ML database may be stored on the smart glasses. The ML database may store a plurality of document templates. For each type of document there may be an associated document template stored on the ML database. Furthermore, each document template may include a plurality of pre-defined characteristics that characterize and define the document template.

In some embodiments, the microprocessor may be configured to execute one or more applications for identifying any anomalies in a document. The identifying may be based at least in part on a comparison of the document to a stored document template.

The document may be a physical paper document that may be within a predetermined proximity to the smart glasses. In some embodiments, the document may be a document displayed on a user interface ("UI"), wherein the UI is within the predetermined proximity.

A user of the smart glasses may be wearing the smart glasses. The user may be holding the document in his hand. The user may place the document on a table. The predetermined proximity may be a distance between the smart glasses and the location of the document that enables the document to be readable to the user's eyes.

When the document is within the predetermined proximity to the smart glasses, the smart glasses may be triggered to activate the scanning device on the smart glasses to scan the document. In some embodiments, when the user's eyes are focused on any portion of the document that is within the predetermined proximity, this may also trigger the activating of the scanning device.

Upon activation of the scanning device, the smart glasses may be configured to both identify the type of document and simultaneously, identify any one or more anomalies within the document.

The smart glasses may determine, via a NLP application on the smart glasses, a document type. The document type may be enabled to be identified by capturing a single complete image of the document. The scanning device may capture one complete image of the whole document.

The smart glasses may search the single complete image, using the NLP application, for one or more pre-defined identifiable features linking to the document type. Pre-defined identifiable features may be one or more features that may accurately identify what the document is. Pre-defined identifiable features may include but are not limited to one or more of a title of the document, a threshold number of the same keyword included in the document, a size of the document and an amount of pages of the document.

For example, the title of the document typically may serve as an indicator of the document type. Additionally some words that may be repeated numerous times on the document may also indicate the document type. Furthermore, the complete image may be compared to pre-stored images of documents. An image character recognition ("ICR") application may be enabled to compare the single complete image of the document to the stored images to match and further identify the type of document.

The smart glasses may be configured to identify the one or more pre-defined identifiable features. In response to the identifying, the smart glasses may determine the type of document.

In parallel to the identification of the document type, the microprocessor is configured to perform a series of actions for analyzing the document to detect any anomalies within the document. It should be appreciated that the series of actions may be performed repetitively provided the user's eyes are focusing on any portion of the document. When the document is removed from within the predetermined proximity to the smart glasses, the microprocessor may be configured to terminate the performing of the series of actions.

The first step in the series of actions may include the microprocessor to trigger a tracking of the user's eye movements. The tracking may be enabled via one or more sensors on the smart glasses.

The tracking may enable determining one or more portions of the document upon which the user's eyes are focused.

The second step in the series of actions may include capturing data, via the scanning device, from the one or more portions of the document. The data may be any text and/or images included within the one or more portions of the document.

The third step in the series of actions may include identifying, in the captured data, a document characteristic. The identifying may be enabled using NLP via the NLP application. The identifying may be enabled using ICR via the ICR application.

A document characteristic may include any text, input box, image or other elements on the document that may be either of significance and/or entail review for accuracy prior to execution of the document.

For example, a document may have five locations within the document where a signature is required. Each of these five locations may be a document characteristic. Additionally, an input box that requires input of a date may need to be reviewed for accuracy. Monetary values inputted on the document may also need to be reviewed for accuracy and consistency.

The fourth step in the series of actions may include retrieving, from the ML database, a predetermined document rule. The predetermined document rule may define at least one feature of the document characteristic. The predetermined document rule may be from a plurality of predetermined document rules stored in a document template correlating to the type of document.

For example, when a date on the document is identified as a document characteristic, the associated predetermined document rule may define the document characteristic with three features. The three features may include that a month, day and year may be required to be identified for each date on the document. In some embodiments, the predetermined document rule may include identifying a specific format to the date, i.e. —_____/_____/_____.

The fifth step in the series of actions may include comparing, via a ML anomaly identifier application, the document characteristic to the predetermined document rule. The comparing may determine whether the document characteristic is in compliance with the predetermined document rule or not.

In some embodiments, the microprocessor may compare the document characteristic to pre-stored images associated with the document template to determine whether the document characteristic is accurate or considered an anomaly. The comparing may be enabled using machine learning.

Each of the document templates stored on the ML database may include a plurality of pre-stored images. The plurality of pre-stored images may be fed into the database prior to a launching of the smart glasses for analyzing documents. The ML database may continuously be fed with additional images in real-time too. In some embodiments, the smart glasses may use these pre-stored images to compare to the document being scanned. The comparison may enable identifying discrepancies between the images that may identify one or more anomalies.

The determination may be the sixth step in the series of actions. When the document characteristic complies with the predetermined document rule, the microprocessor may be configured to repeat the steps within the series of actions.

When the document characteristic fails to comply with the predetermined document rule, this may indicate an anomaly in the document characteristic. When an anomaly in the document characteristic is identified, the microprocessor is configured to trigger the display controller to display an image of the anomaly on a virtual display of the smart glasses. The user of the smart glasses may be enabled to view the anomalies, in real-time, on the display. The user may have the option to save the data displayed, transmit the data to a personal device for correcting and/or delete the data if the user determines the anomaly to be irrelevant or inaccurate. This may be done in response to input received by the user.

The user may interact with the smart glasses via hand gestures, air-based gestures and/or physical or virtual keypad. It should be appreciated that the input received may be via an air-based hand gesture. One or more sensors on the smart glasses device may be configured to identify the input received.

For example, the user input may be received from the user via touch gestures to one or more dynamic and/or static buttons on the smart glasses. The user input may also be received at, and/or sensed by, a nano touch screen included in the smart glasses. The nano touch screen may be a nano light emitting diode ("LED") touch screen. The nano touch screen may be a nano organic light emitting diode ("OLED") touch screen. The nano OLED touch screen may be constructed using OLED technology.

OLED technology may enhance functionality of a smart glasses display. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

In some embodiments, the nano touch screen may be constructed, using liquid metal printing, from atomically-thin indium-tin oxide ("ITO"). During construction, an indium-tin alloy is heated to 200 degrees Celsius. At 200 degrees Celsius, the indium-tin alloy becomes a liquid. The liquid is then rolled over a surface to print nano-thin sheets of ITO. These nano sheets are two-dimensional and have the same chemical make-up as standard ITO. However, these nano sheets have a different crystal structure than standard ITO. The new crystal structure gives the nano sheets new mechanical and optical properties.

One new property may include the full flexibility of the ITO sheets. These ITO sheets also absorb approximately 0.7% of light, which is lower than standard conductive glass that absorbs 5-10% of light. These ITO sheets may also be transparent. As such, these nano ITO sheets provide fully flexible, conductive and transparent material. Therefore, such atomically-thin ITO sheets may be used to produce nano touch screens for inclusion in smart glasses. The ITO may be wrapped around a portion of the lenses and/or frames of the smart glasses.

The nano LED touch screen may receive touch-based user input, also referred to herein as touch gestures. It should be appreciated that the touch gestures may be accepted at one or more portions of the frames and/or lenses of the smart glasses. As such, the nano LED touch screen may cover a portion of the frames and/or lenses of the smart glasses. Touch gestures may include swiping, tapping, squeezing and any other suitable touch gestures. Touch gestures may also include a pattern of any of the above-mentioned gestures.

The user input may also be received from air-based hand and/or body gestures. Air-based hand and/or body gestures may be performed by the user's hand and/or body without specifically touching the smart glasses.

Various sensors may be included in the smart glasses. These sensors may include the nano LED touch screen, the camera(s), an accelerometer, a gyroscope and any other suitable sensors. These sensors may sense the touch gestures, hand gestures and/or air gestures.

Upon sensing the touch gestures, hand gestures and/or air gestures, the sensor(s) and/or associated processors may translate the touch gestures, hand gestures and/or air gestures into user input. The user input may be based on a user input structure. The user input structure may be a digital alphanumerical pad. In some embodiments, the user input structure may be received from an external processor.

Following the displaying of the anomaly, the microprocessor is configured to repeat the series of actions. The series of actions may be a loop that continuously is repeated until the focus of the user's eye is removed from the document for more than the predetermined amount of time or the document is removed from within the predetermined proximity to the smart glasses.

It should be appreciated that when the user's eyes are not focused on any one or more portions of the document for more than the predetermined amount of time, the microprocessor may be configured to terminate the performing of the series of actions. The microprocessor may be further configured to deactivate the scanning device. The predetermined amount of time may vary based off the type of document. The predetermined amount of time may be a range between 1 and 10 seconds. The predetermined amount of time may be, in some embodiments, greater than 10 seconds.

For example, when the document includes many lines of text and data, the user may need to take the focus of his eyes off of the document for a few seconds to rest his eyes. This may not be an indication that the user completed reviewing the document. However, when the document is short i.e.—a check, the user may not need to take the focus of his eyes off of the document for more than two seconds.

Additionally, when the document is outside the predetermined proximity to the smart glasses, the microprocessor may be configured to pause the capturing for the predetermined amount of time. Following the passing of the predetermined amount of time, the microprocessor may be configured to detect, using any one or more sensors, whether the document or a new document is located within the predetermined proximity to the smart glasses. The new document may be a subsequent page to the document. In the event that the document or the new document is located within the predetermined proximity to the smart glasses, the microprocessor may be configured to trigger the performing of the series of actions.

In some embodiments, when the document is determined to be located within the predetermined proximity, methods may include pausing for an additional amount of time to enable confirming that the document is intended to be within the predetermined proximity.

However, in the event that the document or the new document is outside the predetermined proximity to the smart glasses, the microprocessor may be configured to terminate the performing of the series of actions and deactivate the scanning device.

It should be appreciated that for each time the series of actions being performed is repeated, the anomaly displayed on the display may remain on the display and each additional anomaly identified may be added to the display. When the scanning is terminated, the user may be enabled to view all the anomalies on the display.

In some embodiments, following the displaying of the one or more anomalies on the smart glasses, the microprocessor is configured to capture an image of each of the one or more anomalies and further store the image of each of the one or more anomalies temporarily within memory on the smart glasses. These stored images may then be uploaded to a server for additional training of the machine learning ("ML") database or further review.

Following the uploading, the microprocessor may be configured to transmit a notification to a mobile device associated with the user of the smart glasses. The notification may include the one or more images of the anomalies. The notification may also include a listing of the predetermined document rule that is associated with the anomalies.

Following transmitting the notification, the microprocessor may delete the stored captured data from the memory within the smart glasses.

Prior to uploading the images to the server for training, the microprocessor may be configured to search for one or more personally identifiable data on the image of the document. If there is any personal data included in the image, the microprocessor may be configured to delete the personally identifiable data from the image document.

The smart glasses may also include a wireless controller application. The wireless controller application may be configured to interface between the NIC and an external Wi-Fi device. The external Wi-Fi device may be included in the wireless network. The wireless controller application may be configured to transmit, over the wireless network, the anomaly to a server for additional training of the ML database.

In some embodiments, the smart glasses may be enabled to be paired with one or more smart glasses. The pairing may enable sharing of data displayed on the display of the smart glasses. The pairing may be enabled via NFC technology. The pairing may be enabled via an e-sim card on the smart glasses. Once paired, the smart glasses may be configured to transfer the image of the anomaly to the additional one or more smart glasses. This may be enabled using a local network. Following the transfer, the image may be displayed on a display of each of the additional one more smart glasses.

Each user of the smart glasses may also be enabled to initiate input onto the display. The input may be received on the smart glasses via the sensors. The paired smart glasses may all be able to view the input received on each smart glasses.

In some embodiments, the smart glasses device may authenticate the user before using the smart glasses. An authorization application, included in the smart glasses device, may authenticate the user of the smart glasses. The authentication may be performed via an authorization application included in the smart glasses device. The authorization application may authenticate the user based on a group of detected user behavioral characteristics. The group of detected user behavioral characteristics may include gait, speed, voice detection, head movements and body movements. The authorization application may authenticate the user using any suitable authentication method.

The authorization application may include intelligent iris recognition mechanisms that may authenticate the user based on the detected iris.

In some embodiments, methods may include leveraging a plurality of smart glasses at the same time to identify anomalies within a document. The same document may be positioned within predetermined proximity to each of the plurality of smart glasses. Prior to scanning the document, the plurality of smart glasses may be paired. The pairing may link the plurality of smart glasses and may enable sharing of data on each display using NFC and/or a local network.

For each smart glasses, each document characteristic that does not satisfy the predetermined document rule, may be displayed on each of the plurality of smart glasses. When the scanning and performing the series of actions is terminated, there may be duplicate document characteristics displayed. Some document characteristics may only be displayed once.

When a plurality of smart glasses are each reviewing a copy of the same document, the results may sometimes be the same. The results may differ. When the results differ and each smart glasses identified different document characteristics that include anomalies, methods may include only retaining the document characteristics that a majority of the plurality of smart glasses identified and deleting the remaining document characteristics. In some embodiments, methods may include retaining the document characteristics based off of a level of confidence of the smart glasses that identified the document characteristic.

In some embodiments, the identified document characteristics displayed on each smart glasses may be transferred to each of the other plurality of smart glasses, in real-time, as its displayed on the smart glasses display. In other embodiments, the identified document characteristics for each smart glasses may be combined and transferred following the terminating of the scanning device.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative flow diagram 100 of the steps for leveraging smart glasses to identify anomalies in a document. At step 102, smart glasses may be loaded with pre-installed NLP programs as part of tinyML. The smart glasses may also be loaded with a rule-based engine with various document templates representing each type of document.

At step 104, the user of the smart glasses may manually select the module or program from a menu displayed on the smart glasses for activating the scanning of the document. In some embodiments, this may be done manually and in other embodiments, the scanning device is activated based on sensors sensing the document and/or the user's pupil focusing on a document.

At step 106, preferably, simultaneous to the user reading the document, the smart glasses may extract features related to the type of document. An exemplary document may be a check, contract or home-loan. The smart glasses may use natural language processing as part of tinyML to extract the features.

At step 108, the features extracted may be compared with a stored document template using a rule-based engine. Each stored document template may include a list of rules defining the document. For example, when the document being scanned is determined to be a mortgage commitment document, the smart glasses may retrieve a mortgage commitment document template for comparison. The mortgage commitment document template may include a list of rules that may need to be identified within the document. One rule may include that the document requires five pages. Another rule may indicate that eight signatures need to be identified. Another rule may indicate that eight dates may need to be identified on the document. Another rule may indicate that the signatures may each need to be at least substantially similar to one another.

In another example, when the document being scanned is determined to be a check, the smart glasses may retrieve a check document template for comparison. The check document template may include a list of rules that may be associated with checks. One rule may indicate that two dollar amounts need to be identified and that the two dollar amounts need to equal the same number. Another rule may be to determine that the date is valid. Another rule may indicate that the signature, name of receiver and dollar amount all hand-written on the check should be determined to have a substantially similar handwriting.

When an anomaly is identified, the anomalies may be projected in real-time on the smart glass display, as shown at step 110. The display may be an augmented interface. Furthermore, alert notifications associated with the anomalies may be sent to the user of the smart glasses. The notifications may be displayed on the display. The anomalies may be transmitted to a program on the server for future training of the ML database.

When an anomaly is not identified, the smart glasses may continue to extract features from the document as shown at step 106.

In some embodiments, as shown at 114, the smart glasses may be paired with another smart glasses using e-SIM. Any alert notifications displayed on the smart glasses may be relayed to the paired smart glasses.

Figure 2:
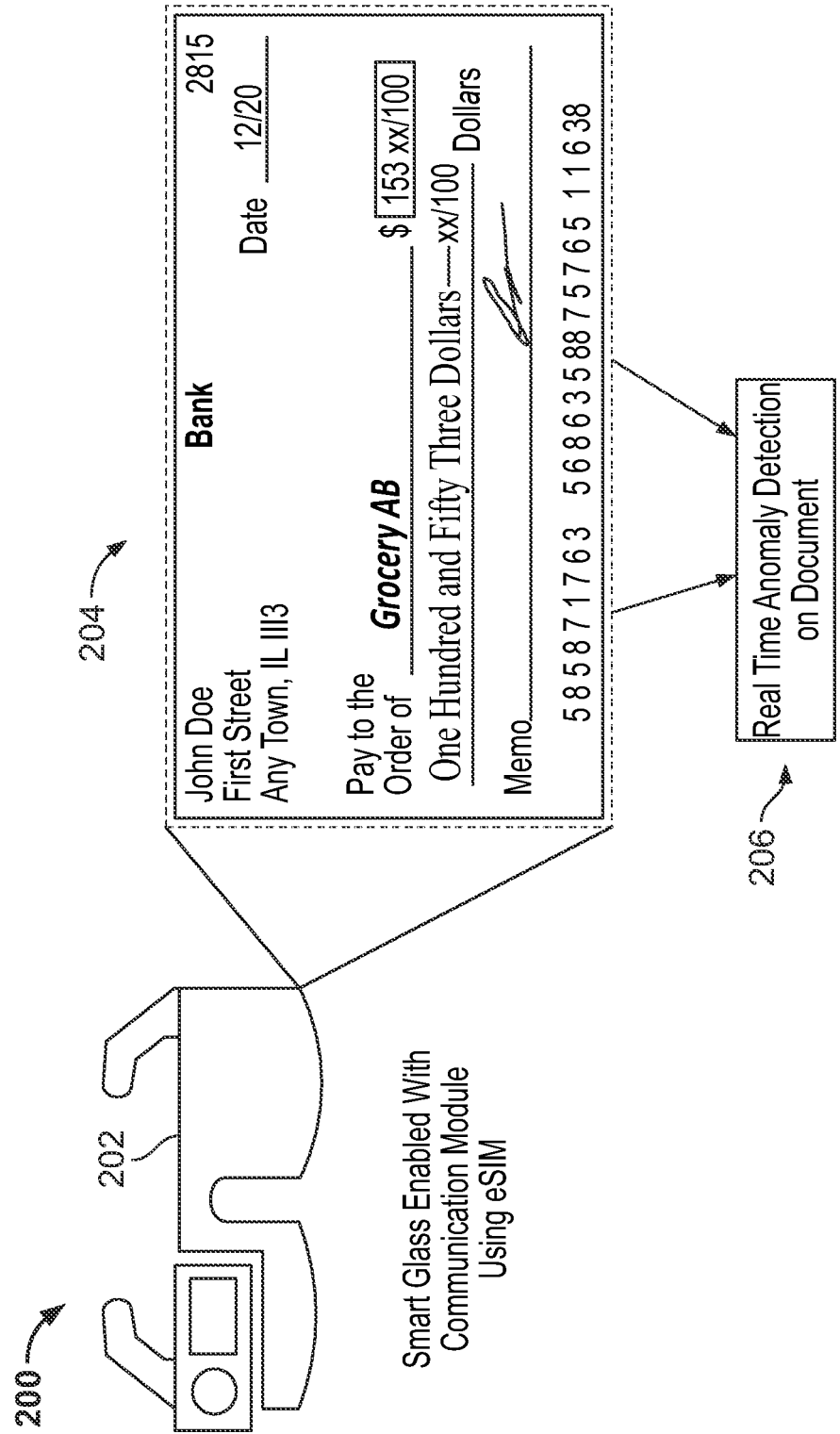
FIG. 2 shows an illustrative diagram in accordance with principles of the disclosure.

FIG. 2 shows an illustrative diagram 200 of smart glasses 202 viewing document 204.

The hardware and software embedded on the smart glasses may enable a real-time anomaly detection on the document, as shown at 206.

Figure 3:
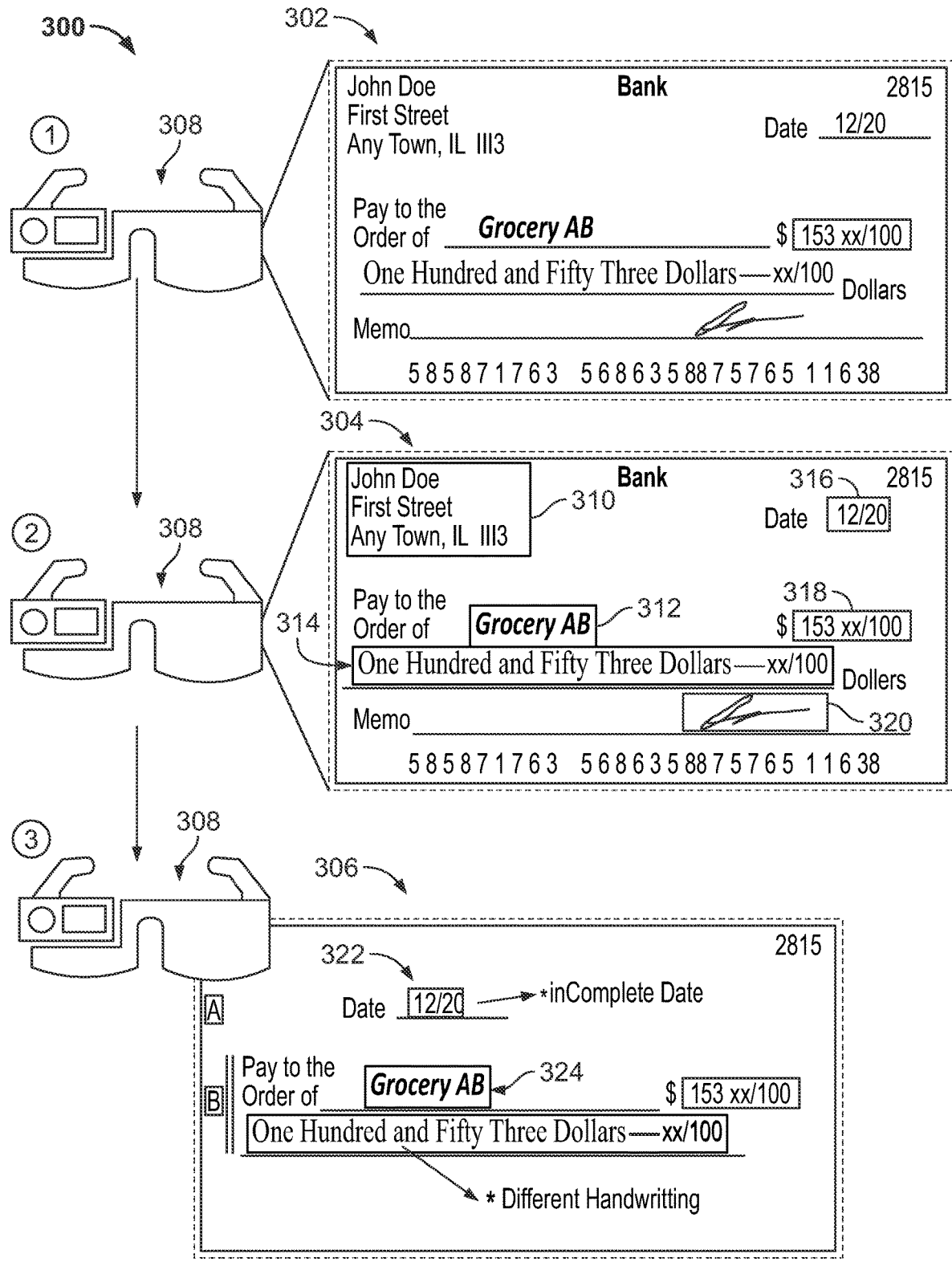
FIG. 3 shows an illustrative diagram in accordance with principles of the disclosure.

FIG. 3 shows an illustrative exemplary diagram 300 of smart glasses 308 identifying anomalies on document 302.

At 302, smart glasses 308 may be viewing a document. The document in this exemplary diagram 300 may be a check. The check may be scanned as a complete single image in order to identify the type of document. This may enable comparing the check to the matching document template for accuracy.

At 304, smart glasses 308 may extract each document characteristic that may need to be reviewed for anomalies. The document characteristics extracted may be shown at 310, 312, 314, 316, 318 and 320.

At 306, following the analyzing for anomalies, the identified anomalies may be displayed to the user on the display of the smart glasses. In this exemplary check, two anomalies have been identified. At 322, the date 316 may be incomplete. The date only includes a month and a day. However, the date is missing the year. Additionally, the document characteristic 312 and 314 may be detected to have two different handwritings and may therefore be questionable and considered an anomaly, as shown at 324.

Figure 4:
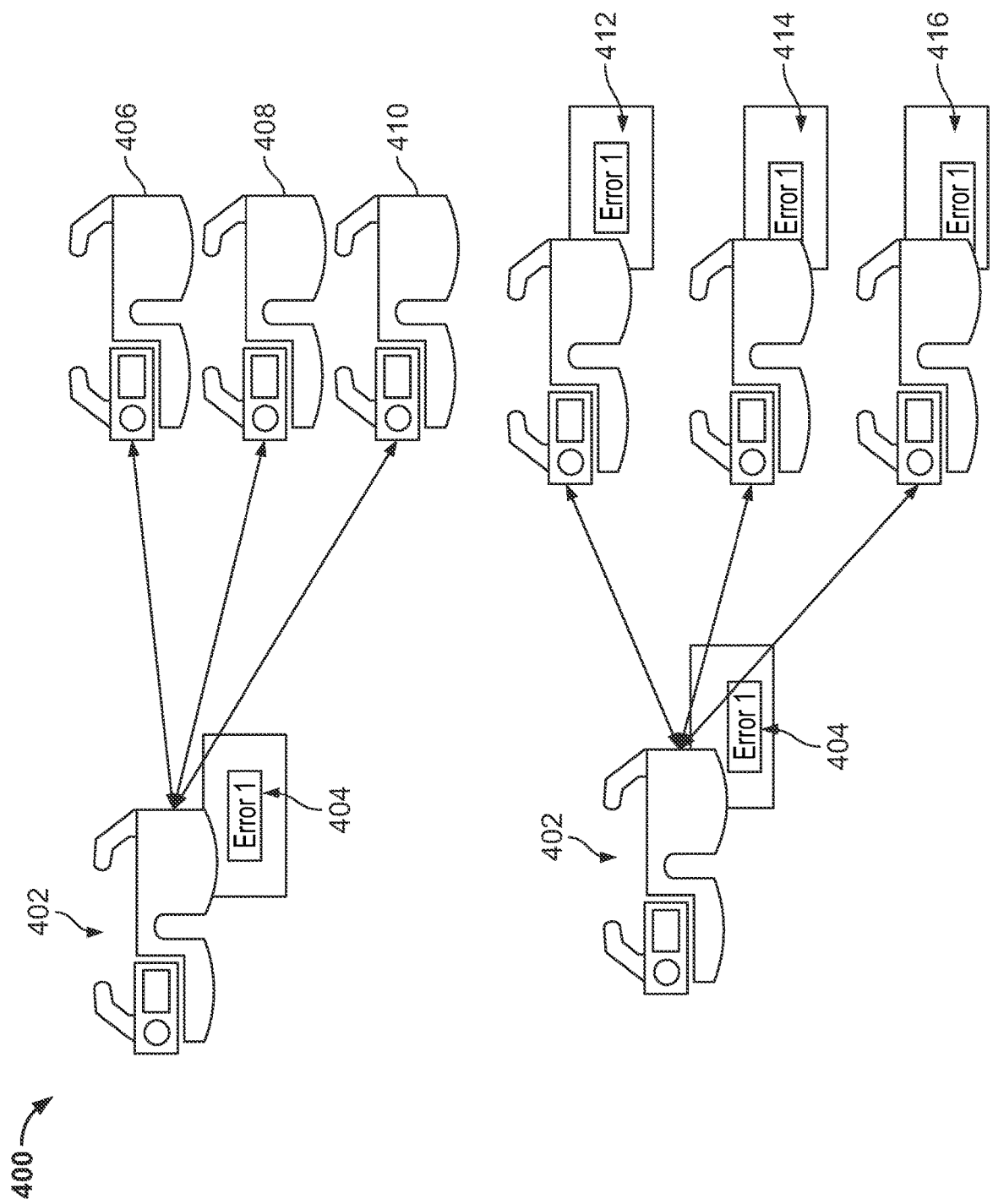
FIG. 4 shows an illustrative diagram in accordance with principles of the disclosure.

FIG. 4 shows an illustrative exemplary diagram 400 of smart glasses pairing with one or more additional smart glasses and to further share the data displayed on the smart glasses.

Smart glasses 402 may be viewing a notification message of an error and/or an anomaly identified in a document. The notification message may be displayed on the smart glasses display 404. The user of smart glasses 402 may prefer to share the data with one or more users. Smart glasses 402 may be enabled to pair the smart glasses with smart glasses 406, 408 and 410. The data may be directly transmitted from smart glasses 402 to each of smart glasses 406, 408 and 410 via a local network.

In some embodiments, the pairing may be enabled following authenticating each of smart glasses 406, 408 and 410. The authenticating may be an automatic process. The authenticating may be enabled using NFC. Whereby when the smart glasses 402 is in near proximity to smart glasses 406, 408 and 410, smart glasses 402 may be enabled to retrieve ID data associated with each of smart glasses 406, 408 and 410 using the NFC reader, and further confirming the ID data using the microprocessor in smart glasses 402.

Following the pairing of the smart glasses, data displayed on display 404 of smart glasses 402 may be transmitted and shared to smart glasses 406, 408 and 410 as shown on display 412, 414, and 416.

In some embodiments, the pairing of these smart glasses 402, 406, 408 and 410 may occur prior to scanning the document. Simultaneous to each smart glasses scanning and searching the document for anomalies, the anomalies may be displayed on all smart glasses at the same time, as shown at 404, 412, 414 and 416.

Furthermore, any comments and/or editions that may be received at any of the smart glasses via input by a user may be displayed on each of the plurality of displays for each of the smart glasses. The input may be a hand movement in the air. The input may include circling, highlighting and/or underlining data displayed. The input may include a message associated with data displayed.

Figure 5:
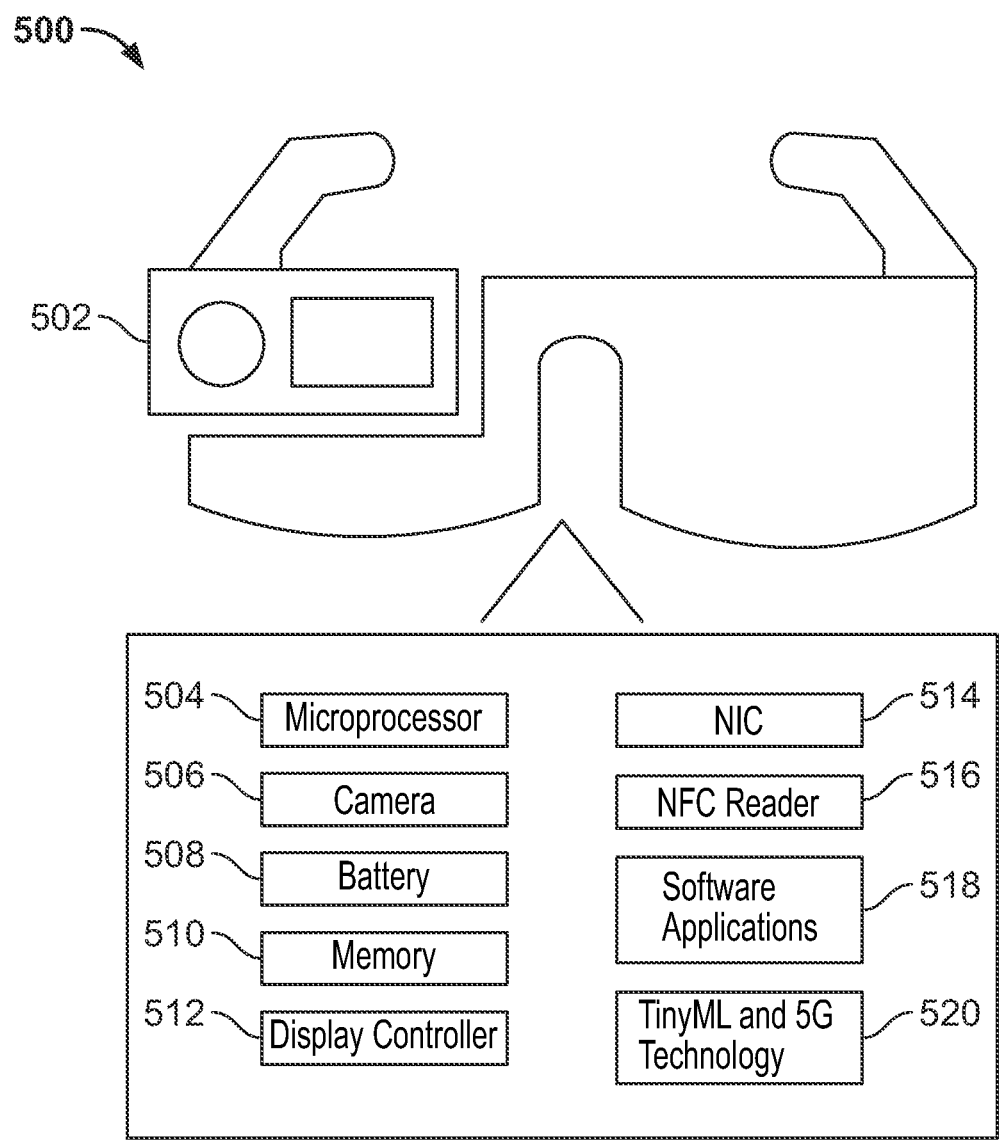
FIG. 5 shows an illustrative architecture in accordance with principles of the disclosure.

FIG. 5 shows illustrative architecture 500 for smart glasses 502. Smart glasses 502 may include microprocessor 504, a camera 506, battery 508 and memory 510. Camera 506 may also include other forms of scanning devices. Smart glasses 502 may include one or more sensors, not featured in the figure.

Smart glasses 502 may further include display controller 512. Display controller 512 may be a controller for a display. Display controller 512 may be the actual display. In some embodiments the display may be an augmented reality display. Smart glasses 502 may also include NIC 514 and NFC reader 516. Smart glasses 502 may implement tinyML and 5G technology, as shown at 520 to enable identifying anomalies at the smart glasses 502. It should be appreciated that both the hardware and software embedded within the smart glasses 502 may be leveraged to identify anomalies in documents scanned by the smart glasses.

Thus, methods and apparatus for leveraging smart glasses to identify anomalies in documents is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for leveraging smart glasses for identifying anomalies in a document in real-time and notifying a user of the smart glasses of the anomalies, the method comprising:

activating a scanning device on the smart glasses for scanning the document, the smart glasses including the scanning device;

identifying the document, the document being located within a predetermined proximity to the smart glasses;

performing, in parallel, a determining of a document type of the document and a series of actions on the document for identifying anomalies:

the determining comprising:

capturing a single complete image of the document;

searching the single complete image, using natural language processing ("NLP"), for one or more pre-defined identifiable features relating to a type of the document;

identifying the one or more pre-defined identifiable features; and based on the identifying, determining the type of document; and the series of actions being performed continuously until the document is outside the predetermined proximity to the smart glasses for a predetermined amount of time, the series of actions comprising:

triggering a tracking of the user's eye movements;

identifying, based at least in part on the tracking, one or more portions of the document upon which the user's eyes are focused;

capturing data from the one or more portions of the document;

identifying, in the captured data, a document characteristic;

retrieving, from a machine learning ("ML") database, a predetermined document rule, the predetermined document rule defining at least one feature of the document characteristic, the predetermined document rule retrieved from among a plurality of predetermined document rules stored in a document template correlating to the type of document;

comparing the document characteristic to the predetermined document rule; and wherein:

when the document characteristic complies to the predetermined document rule, the method comprises, repeating the series of actions; and when the document characteristic fails to comply with the predetermined document rule, the method comprises:

displaying the document characteristic, on a display of the smart glasses; and repeating the series of actions.

2. The method of claim 1 wherein when the user's eyes are not focused on any one or more portions of the document for more than the predetermined amount of time, the method comprises terminating the performing of the series of actions and deactivating the scanning device.

3. The method of claim 1 wherein when the document is outside the predetermined proximity to the smart glasses the method comprises:

pausing the capturing for the predetermined amount of time;

following the predetermined amount of time, determining whether the document or a new document is located within the predetermined proximity to the smart glasses; and in an event that the document or the new document is located within the predetermined proximity to the smart glasses, the method comprises performing the series of actions; and in an event that the document or the new document is outside the predetermined proximity to the smart glasses, the method comprises terminating the performing of the series of actions and deactivating the scanning device.

4. The method of claim 1 wherein, when the document characteristic is an image, the method further comprises, comparing, using ML, the image to a plurality of pre-stored images associated with the document template for identifying anomalies.

5. The method of claim 1 wherein following the displaying, the method comprises:
capturing an image of the document characteristic;
storing the image temporarily within memory on the smart glasses; and
uploading the image to a server for additional training of the ML database.

6. The method of claim 5 wherein prior to the uploading, the method comprises searching for one or more personally identifiable data on the image and deleting the personally identifiable data from the image document.

7. The method of claim 6 wherein following the uploading, the method comprises:
transmitting a notification to a mobile device associated with the user of the smart glasses, the notification comprising the image; and
deleting the stored captured data from the smart glasses.

8. The method of claim 1 wherein the document is a physical paper document.

9. The method of claim 1 wherein the pre-defined identifiable features include one or more of a title of the document, a threshold number of a same keyword included in the document, a size of the document and an amount of pages of the document.

10. The method of claim 1 further comprising pairing the smart glasses with an additional one or more smart glasses, the pairing comprising:
transferring the image to the additional one or more smart glasses using a local network; and
displaying the image on the display of each of the additional one more smart glasses.

11. A smart glasses device comprising:
a pair of lenses;
a frame supporting the pair of lenses;
a battery configured to power a microprocessor, a scanning device and a display controller, each of the battery, microprocessor, scanning device and display controller are at least partially embedded in the frame;
a microprocessor being configured to execute one or more applications for identifying anomalies in a document based at least in part on a comparison of the document to a stored document template;
a nano wireless network interface card ("NIC"), said NIC for establishing communication with a wireless network;
an active near field communication ("NFC") reader configured to establish a communication with one or more other smart glasses devices within a predetermined proximity to the smart glasses device;
a machine learning ("ML") database stored on the smart glasses, the ML database comprising a plurality of document templates for each type of document and a plurality of pre-defined characteristics for each document template;

wherein, in response to a detection of a document within a predetermined proximity to the smart glasses, using the microprocessor, the smart glasses is configured to:
activate the scanning device on the smart glasses to scan the document;
determine, via a natural language processing ("NLP") application on the smart glasses, a document type by:
capturing a single complete image of the document;
searching the single complete image, using the NLP application, for one or more pre-defined identifiable features linking to the document type;
identifying the one or more pre-defined identifiable features; and
based on the identifying, determining the type of document; and
in parallel to the determining of the document type, the microprocessor is configured to perform a series of actions comprising:
trigger a tracking of eye movements of a user of the smart glasses eyes, the tracking via one or more sensors on the smart glasses;
identify, based at least in part on the tracking, one or more portions of the document which the user's eyes focused on;
capture data, via the scanning device, from the one or more portions of the document;
identify in the captured data, using the NLP application, a document characteristic;
retrieve, from the ML database, a predetermined document rule, the predetermined document rule defining at least one feature of the document characteristic, the predetermined document rule from a plurality of predetermined document rules stored in a document template correlating to the type of document; and
compare, via a ML anomaly identifier application, the document characteristic to the predetermined document rule; and
wherein:
when the document characteristic complies with the predetermined document rule, the microprocessor is configured to repeat the series of actions; and
when an anomaly in the document characteristic is identified based off the predetermined document rule, the microprocessor is configured to:
trigger the display controller to display an image of the anomaly, on a display of the smart glasses; and
repeat the series of actions; and
a wireless controller application configured to:
interface between the NIC and an external Wi-Fi device, the external Wi-Fi device included in the wireless network; and
transmit, over the wireless network, the anomaly to a server for additional training of the ML database.

12. The smart glasses device of claim 11 wherein the document is a physical paper document.

13. The smart glasses device of claim 11 wherein following the display controller displaying the image, the microprocessor is further configured to:
store the image the anomaly temporarily within memory on the smart glasses; and
upload the image to a server for additional training of the ML database.

14. The smart glasses device of claim 13 wherein prior to the uploading, the microprocessor is further configured to search for one or more personally identifiable data on the image of the document and delete the personally identifiable data from the image of the document.

15. The smart glasses device of claim 13 wherein following the uploading, the microprocessor is further configured to:
   transmit a notification to a mobile device associated with the user of the smart glasses, the notification comprising the image of the anomaly; and
   delete the stored captured data from the smart glasses.

16. The smart glasses device of claim 11 wherein when the user's eyes are not focused on any one or more portions of the document for more than a predetermined amount of time, the microprocessor is configured to terminate the performing of the series of actions and deactivate the scanning device.

17. The smart glasses device of claim 11 wherein when the document is outside the predetermined proximity to the smart glasses the microprocessor is configured to:
   pause the scanning device from capturing for a predetermined amount of time; and
   following the predetermined amount of time, determine whether the document or a new document is located within the predetermined proximity to the smart glasses; and
   in the event that the document or the new document is located within the predetermined proximity to the smart glasses, the microprocessor is configured to continue to perform the series of actions; and
   in the event that the document or the new document is outside the predetermined proximity to the smart glasses, the microprocessor is configured to terminate the performing of the series of actions and deactivate the scanning device.

18. The smart glasses device of claim 11 wherein when the document characteristic is an image characteristic, an image character recognition ("ICR") application is configured to, compare, using machine learning ("ML"), the image characteristic to a plurality of pre-stored images of document template characteristics for identifying anomalies.

19. A method for leveraging a plurality of smart glasses for identifying anomalies in a document in real-time and notifying a plurality of users of the smart glasses of the anomalies, the method comprising:
   pairing each of the plurality of smart glasses, the pairing enabling sharing data on each display of each of the plurality of smart glasses;
   for each of the plurality of smart glasses, the method comprises:
      activating a scanning device on the smart glasses for scanning the document, the smart glasses including the scanning device;
      identifying the document, the document being located within a predetermined proximity to the smart glasses; and
      performing, in parallel, a determining of a document type of the document and a series of actions on the document for identifying anomalies:
      the determining comprising:
         capturing a single complete image of the document;
         searching the single complete image, using natural language processing ("NLP"), for one or more pre-defined identifiable features relating to a type of the document (or document type);
         identifying the one or more pre-defined identifiable features; and
         based on the identifying, determining the type of document; and
      the series of actions being performed continuously until the document is outside the predetermined proximity to the smart glasses for a predetermined amount of time, the series of actions comprising:
         triggering a tracking of the user's eye movements;
         identifying, based at least in part on the tracking, one or more portions of the document upon which the user's eyes are focused;
         capturing data from the one or more portions of the document;
         identifying, in the captured data, a document characteristic;
         retrieving, from a machine learning ("ML") database, a predetermined document rule, the predetermined document rule defining at least one feature of the document characteristic, the predetermined document rule retrieved from among a plurality of predetermined document rules stored in a document template correlating to the type of document; and
         comparing the document characteristic to the predetermined document rule; and
      wherein:
         when the document characteristic complies to the predetermined document rule, the method comprises, repeating the series of actions;
         when the document characteristic fails to comply with the predetermined document rule, the method comprises:
            displaying the document characteristic, on a display of each of the smart glasses; and
            repeating the series of actions.

20. The method of claim 19 wherein for each of the plurality of smart glasses, when the document is outside the predetermined proximity of the smart glasses for the predetermined amount of time, the method comprises terminating the performing of the series of actions and deactivating the scanning device.

* * * * *